(12) United States Patent
Asozu

(10) Patent No.: US 10,317,753 B2
(45) Date of Patent: Jun. 11, 2019

(54) LIQUID CRYSTAL DISPLAY DEVICE

(71) Applicant: Japan Display Inc., Tokyo (JP)

(72) Inventor: Genki Asozu, Tokyo (JP)

(73) Assignee: Japan Display Inc., Tokyo (JP)

( * ) Notice: Subject to any disclaimer, the term of this patent is extended or adjusted under 35 U.S.C. 154(b) by 153 days.

(21) Appl. No.: 15/262,041

(22) Filed: Sep. 12, 2016

(65) Prior Publication Data

US 2017/0139289 A1    May 18, 2017

(30) Foreign Application Priority Data

Nov. 16, 2015   (JP) ................................. 2015-223742

(51) Int. Cl.
| | |
|---|---|
| *G02F 1/1343* | (2006.01) |
| *G02F 1/1333* | (2006.01) |
| *G02F 1/1339* | (2006.01) |
| *G02F 1/1335* | (2006.01) |
| *G02F 1/1337* | (2006.01) |
| *G02F 1/1341* | (2006.01) |

(52) U.S. Cl.
CPC ...... *G02F 1/134363* (2013.01); *G02F 1/1339* (2013.01); *G02F 1/13394* (2013.01); *G02F 1/13439* (2013.01); *G02F 1/133308* (2013.01); *G02F 1/133345* (2013.01); *G02F 1/1337* (2013.01); *G02F 1/1341* (2013.01); *G02F 1/133512* (2013.01); *G02F 1/133514* (2013.01); *G02F 2001/13415* (2013.01); *G02F 2001/133337* (2013.01); *G02F 2201/121* (2013.01); *G02F 2201/123* (2013.01)

(58) Field of Classification Search
None
See application file for complete search history.

(56) References Cited

U.S. PATENT DOCUMENTS

| | | | |
|---|---|---|---|
| 2002/0060768 A1* | 5/2002 | Chung | G02F 1/1339 349/139 |
| 2005/0128367 A1* | 6/2005 | Hoke | G02F 1/133371 349/1 |
| 2009/0268145 A1 | 10/2009 | Anjo et al. | |

(Continued)

FOREIGN PATENT DOCUMENTS

| | | |
|---|---|---|
| JP | H8-328042 A | 12/1996 |
| JP | 2009-265484 A | 11/2009 |

(Continued)

*Primary Examiner* — Edward J Glick
*Assistant Examiner* — Anthony G Quash
(74) *Attorney, Agent, or Firm* — Thypha IP LLC

(57) ABSTRACT

A liquid crystal display device is configured to prevent the appearance on its display of a black stain stemming from a drop in volume resistivity of liquid crystal caused by ions therein. The device includes a thin-film transistor (TFT) substrate and a counter substrate bonded together along the periphery thereof by a seal material. The TFT substrate and the counter substrate have liquid crystal sandwiched therebetween and include a display area. A second wall is formed outside the display area over the TFT substrate. A second electrode is formed over the second wall. A first wall is formed between the second wall and the display area. A first electrode is formed over the first wall. The first wall has a gap against the counter substrate.

14 Claims, 13 Drawing Sheets

(56) References Cited

U.S. PATENT DOCUMENTS

| | | | |
|---|---|---|---|
| 2012/0194494 A1* | 8/2012 | Jung | G02F 1/133723 345/208 |
| 2013/0135569 A1* | 5/2013 | Nagami | G02F 1/1339 349/106 |
| 2014/0027791 A1* | 1/2014 | Cho | H01L 33/44 257/88 |
| 2014/0307190 A1 | 10/2014 | Tomikawa | |
| 2015/0029432 A1* | 1/2015 | Ishikawa | G02F 1/13394 349/43 |
| 2016/0041413 A1* | 2/2016 | Nishino | G02F 1/1339 349/42 |
| 2016/0091764 A1 | 3/2016 | Asozu et al. | |
| 2017/0123247 A1* | 5/2017 | Hirota | G02F 1/1337 |

FOREIGN PATENT DOCUMENTS

| | | |
|---|---|---|
| JP | 2014-206622 A | 10/2014 |
| JP | 2016-071228 A | 5/2016 |

* cited by examiner

LIQUID CRYSTAL DISPLAY DEVICE

CLAIM OF PRIORITY

The present application claims priority from Japanese Patent Application JP 2015-223742 filed on Nov. 16, 2015, the content of which is hereby incorporated by reference into this application.

BACKGROUND OF THE INVENTION

1. Field of the Invention

The present disclosure relates to a display device. More particularly, the disclosure relates to a liquid crystal display device that provides against display unevenness attributable to ion aggregates.

2. Description of the Related Art

Liquid crystal display devices are generally configured to have a thin-film transistor (TFT) substrate disposed opposite to a counter substrate with liquid crystal sandwiched therebetween, the TFT substrate typically having pixel electrodes and TFTs formed thereon in a matrix pattern. The display device forms an image by suitably controlling the light transmittance of liquid crystal molecules per pixel.

Liquid crystal includes impurities that tend to be ionized. Ions move in a particular direction inside a display area of the device and are liable to be localized near the display area periphery. The localized ions reduce the resistance of the liquid crystal. An image displayed on the liquid crystal display area will have a black stain appearing at a location where the liquid crystal resistance is low.

JP-A-2014-206622 describes a configuration in which dummy electrodes formed outside the display area and impressed with a predetermined voltage to attract ions toward the outside of the display area. JP-A-2009-265484 describes a configuration in which shielding electrodes are formed outside the display area on the TFT substrate side to shield the display area from being affected by a scanning voltage from scanning line leader lines formed in the display area periphery. JP-A-1996-328042 describes a configuration in which, with a scanning line driving circuit incorporated in a liquid crystal display panel, shielding electrodes are formed in a manner covering the scanning line driving circuit so as to shield the liquid crystal against a direct-current voltage from the scanning line driving circuit.

SUMMARY OF THE INVENTION

There is a growing need to maximize the display area of the liquid crystal display panel while minimizing the external form of the panel. To do so involves minimizing the width between the edge of the display area and that of the liquid crystal display panel, i.e., the width of the frame. As a result, the ions supposed to be collected outside the display area tend to move back to the periphery of the display area and are likely to trigger a black stain there.

Also, when the width of the frame is reduced, the voltage impressed to ion trap electrodes formed in the frame area can affect the display area and lower display image quality.

The present disclosure has been made in view of the above circumstances and provides arrangements for preventing the ions trapped outside the display area from moving back to the display area while protecting the display area from being affected by the voltage impressed to the ion trap electrodes formed outside the display area.

The present disclosure proposes overcoming the above circumstances using the typical embodiments outlined below.

(1) According to one embodiment of the present disclosure, there is provided a liquid crystal display device including a TFT substrate and a counter substrate bonded together along the periphery thereof by a seal material. The TFT substrate and the counter substrate have liquid crystal sandwiched therebetween and include a display area. A second wall is formed outside the display area over the TFT substrate. A second electrode is formed over the second wall. A first wall is formed between the second wall and the display area. A first electrode is formed over the first wall. The first wall has a gap against the counter substrate.

(2) Preferably in the liquid crystal display device described in paragraph (1) above, the height of the first wall, represented by h1, and the thickness of a liquid crystal layer in the display area, represented by g, may be in a relationship defined as $g/3 \leq h1 \leq 2g/3$.

(3) Preferably in the liquid crystal display device described in paragraph (1) above, the height of the second wall, represented by h2, and the thickness of a liquid crystal layer in the display area, represented by g, may be in a relationship defined as $g/3 \leq h2 \leq 2g/3$.

(4) According to another embodiment of the present disclosure, there is provided a liquid crystal display device including a TFT substrate and a counter substrate bonded together along the periphery thereof by a seal material. The TFT substrate and the counter substrate have liquid crystal sandwiched therebetween and include a display area. A second electrode is formed outside the display area over the TFT substrate. A first wall is formed between the second electrode and the display area. A first electrode is formed over the first wall. The first wall has a gap against the counter substrate.

(5) Preferably in the liquid crystal display device described in paragraph (4) above, the height of the first wall, represented by h1, and the thickness of a liquid crystal layer in the display area, represented by g, may be in a relationship defined as $g/3 \leq h1 \leq 2g/3$.

(6) According to still another embodiment of the present disclosure, there is provided a liquid crystal display device including a thin-film transistor (TFT) substrate and a counter substrate bonded together along the periphery thereof by a seal material. The TFT substrate and the counter substrate have liquid crystal sandwiched therebetween and include a display area. An organic passivation film is formed over the TFT substrate. The organic passivation film has a groove formed therein in a manner surrounding the display area. A first electrode is formed over a side wall of the groove on the side of the display area. A second electrode is formed over a side wall of the groove on the opposite side of the display area.

(7) Preferably in the liquid crystal display device described in paragraph (6) above, the depth of the groove, represented by h, and the thickness of a liquid crystal layer in the display area, represented by g, may be in a relationship defined as $g/3 \leq h \leq 2g/3$.

BRIEF DESCRIPTION OF THE DRAWINGS

Further objects and advantages of the present invention will become apparent upon a reading of the following description and appended drawings in which.

DESCRIPTION OF THE PREFERRED EMBODIMENTS

The behavior of ions dissolved in liquid crystal is described first, prior to the description that follows of specific embodiments of the present disclosure. The ions in liquid crystal tend to be charged positively. The liquid crystal is driven by a voltage impressed between pixel electrodes and a common electrode. The ions dissolved in the liquid crystal aggregate in a particular direction under the influence of the shape of the pixel electrodes, for example.

Figure 13:
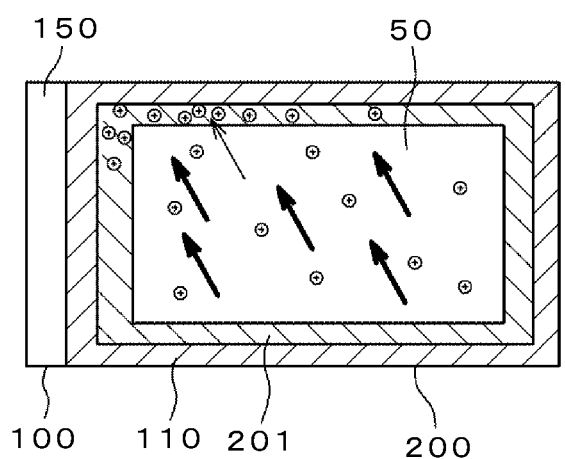
FIG. 13 is a schematic plan view showing problems with the typical existing liquid crystal display device.
Figure 14:
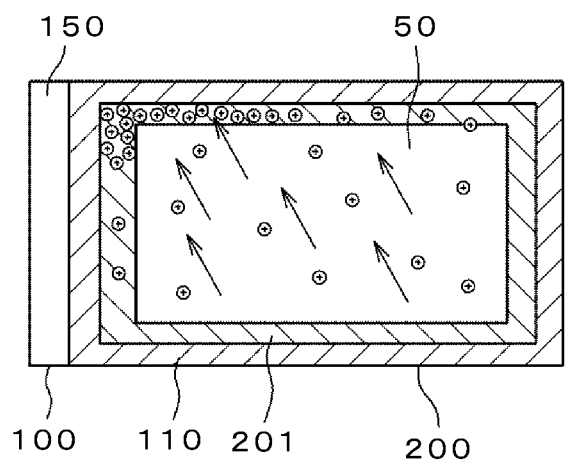
FIG. 14 is another schematic plan view showing problems with the typical existing liquid crystal display device.

FIG. 13 is a schematic plan view showing how ions behave in liquid crystal. In FIG. 13, the liquid crystal is sandwiched between a TFT substrate 100 and a counter substrate 200. FIG. 13 shows the ions to be attracted toward the top left corner of the screen. Under the influence of the pixel electrode shape, for example, the ions tend to aggregate in a specific direction of the screen. In FIG. 13, a light shielding film 201 is formed inside a seal material 110, with ions aggregating under the light shielding film 201. FIG. 14 shows a state in which the ions further aggregate over operation time in the periphery of the screen. In FIG. 14, the ions are still outside a display area 50, i.e., under the light shielding film 201, so that images on the screen are left unaffected.

Figure 15:
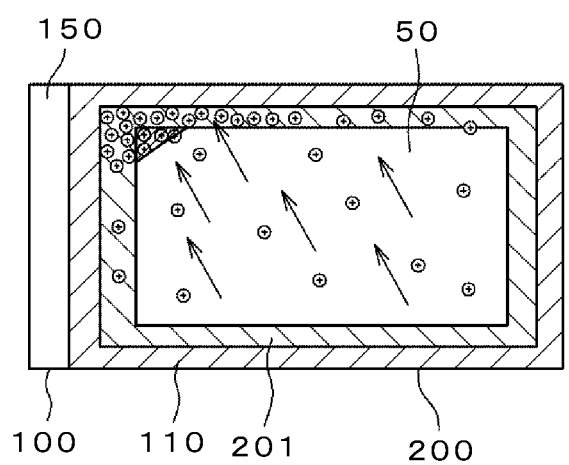
FIG. 15 is still another schematic plan view showing problems with the typical existing liquid crystal display device.

FIG. 15 shows a state in which upon elapse of a further operation time period, the ions aggregating in the top left corner of the display area 50 move from under the light shielding film 201 and into the display area 50. FIG. 15 depicts a black stain being formed in the top left corner of the display area 50 to which the ions have moved.

The phenomenon of ions moving to the display area periphery is more likely to occur the narrower the width of the frame. An object of the present disclosure is to prevent the black stain from appearing in the display area periphery in such a manner. The present disclosure will now be described below in detail using embodiments.

First Embodiment

Figure 1:
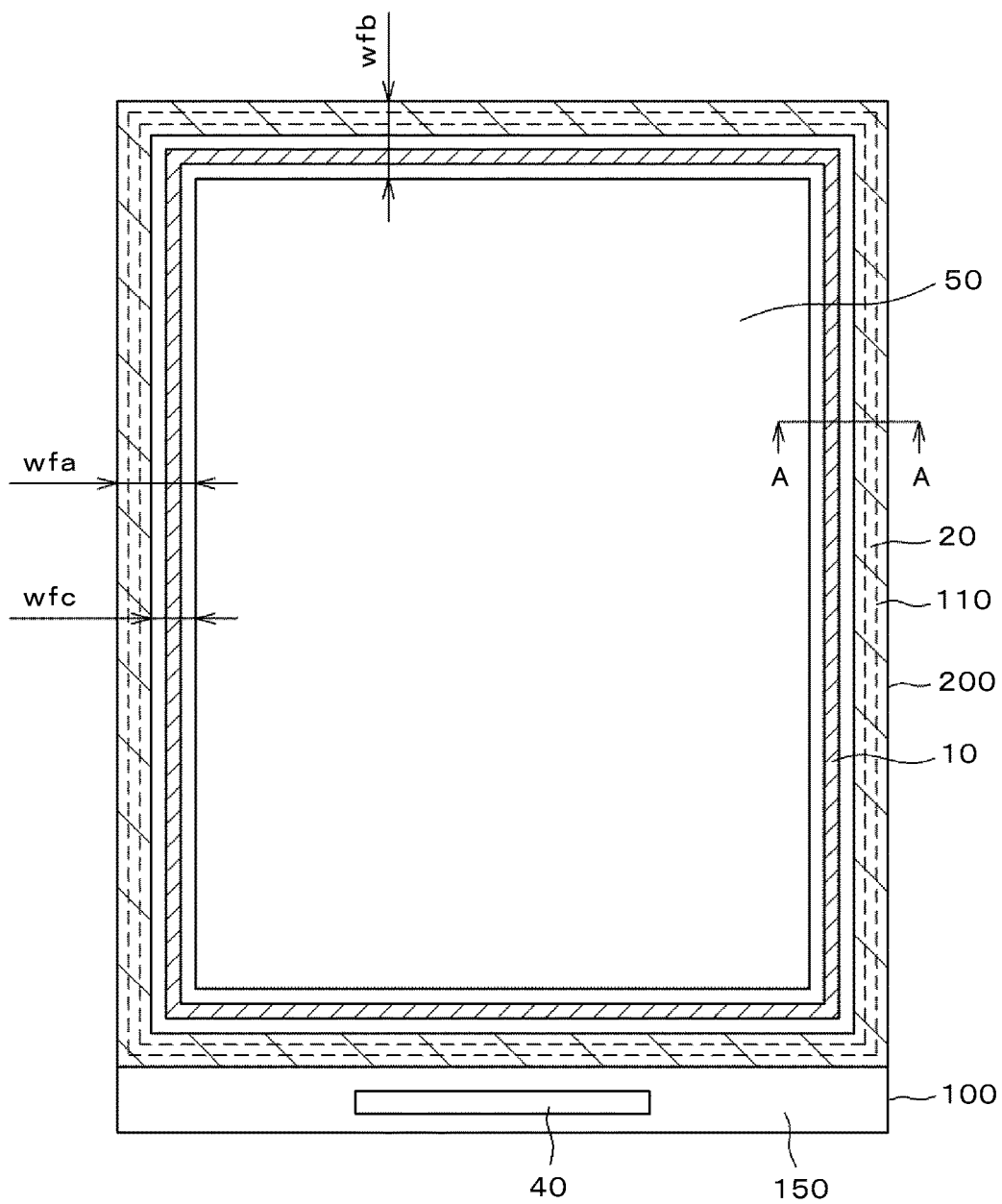
FIG. 1 is a plan view showing a typical liquid crystal display device as an embodiment of the present disclosure.

FIG. 1 is a plan view showing a liquid crystal display panel embodying the present disclosure and used on a mobile phone for example. In FIG. 1, a TFT substrate 100 and a counter substrate 200 are bonded together in the periphery thereof by the seal material 110, the two substrates having liquid crystal sandwiched therebetween. The TFT substrate 100 is formed to be larger than the counter substrate 200. That portion of the TFT substrate 100 which is not covered by the counter substrate 200 constitutes a terminal area 150. A driver integrated circuit (IC) 40 is disposed in the terminal area 150. A flexible wiring substrate for externally feeding power and signals to the liquid crystal display panel is connected to the terminal area 150.

In FIG. 1, a second wall 20 topped by a second electrode is formed under the seal material 110 to trap ions. Also in FIG. 1, a first wall 10 topped by a first electrode is formed between the display area 50 and the seal material 110. This embodiment is designed to let the ions aggregate between the first wall 10 and the seal material 110 and to prevent the aggregated ions from moving into the display area 50.

In recent years, the distance between the edge of the display area and that of the liquid crystal display panel, i.e., the so-called frame width, has been narrowing. For example, the frame width wfa on the long side in FIG. 1 is about 0.5 mm or less. The distance wfc between the edge of the seal material 110 and that of the display area 50 can be about 0.1 mm. Sometimes, the frame width on the long side of the liquid crystal display panel may be different from the frame side on its short side. For example, the short-side frame width wfb in FIG. 1 is about 0.9 mm or less, which may be wider than the long-side frame width. In some cases, the short-side frame width on the terminal area side is different from the short-side frame width on the opposite side.

Figure 2:
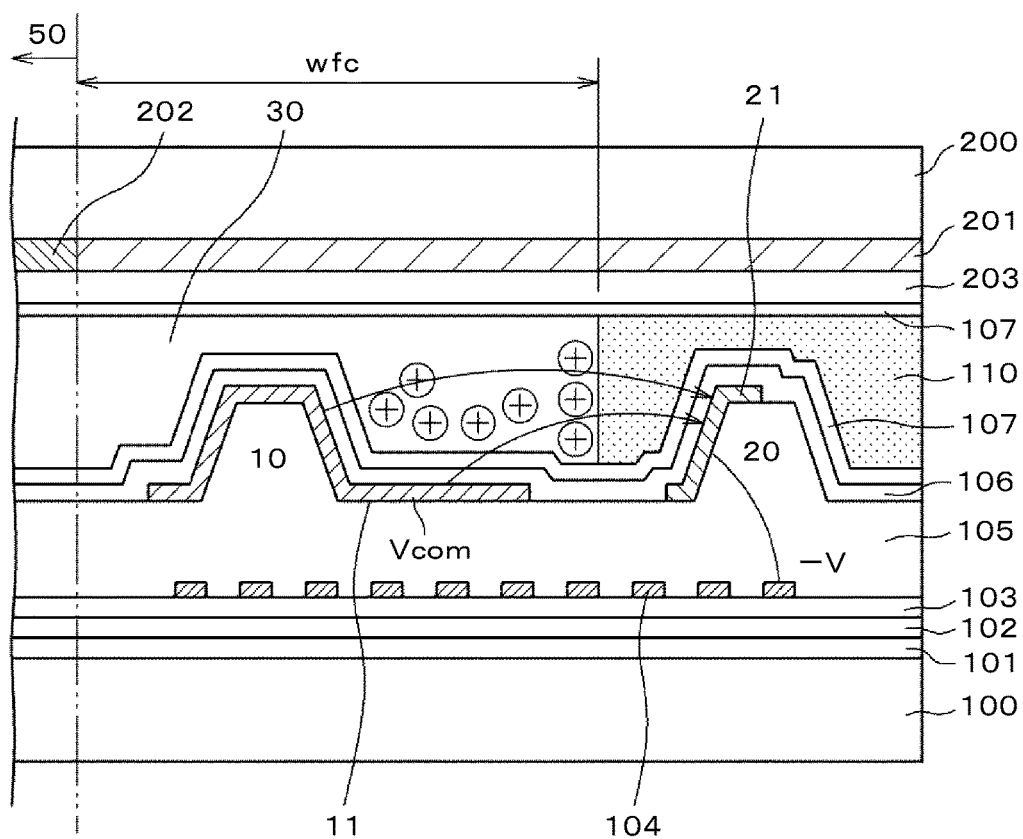
FIG. 2 is a cross-sectional view taken on line A-A in FIG. 1.

FIG. 2 is a cross-sectional view of a seal portion, taken on line A-A in FIG. 1. A layered structure depicted in FIG. 2 represents a cross-section of a so-called in-plane-switching (IPS) liquid crystal display device. What matters with the liquid crystal display device are its viewing angle characteristics. The IPS method involves driving liquid crystal molecules by electric fields parallel to the substrates, thereby offering good viewing angle characteristics. The IPS method is characterized by the pixel electrodes and the common electrode being formed on the TFT substrate side. That is, a signal voltage is impressed between the first electrode such as an indium-tin-oxide (ITO) transparent electrode formed flat and the second electrode such as an ITO transparent electrode, with a capacitance insulating film interposed therebetween. The impressed signal voltage rotates liquid crystal molecules to control their transmittance per pixel, thereby forming an image. The first electrode may be constituted by the pixel electrodes or by the common electrode. The second electrode may also be formed by the pixel electrodes or by the common electrode.

In FIG. 2, a base film 101 is formed over the TFT substrate 100. The base film 101 is intended to protect the semiconductors formed in the display area from being contaminated by impurities from a glass substrate. The base film is generally formed by silicon dioxide ($SiO_2$) or silicon nitride (SiN). In some cases, the base film is constituted by a two-layer structure made of an $SiO_2$ film and an SiN film.

A gate insulating film 102 is formed over the base film 101. An interlayer insulating film 103 is formed over the gate insulating film 102. The interlayer insulating film 103 is intended to insulate scanning lines from video signal lines in the display area. Formed over the interlayer insulating film 103 are leader lines 104 that connect the scanning lines or video signal lines in the display area with an integrated circuit (IC) driver formed in the terminal area.

An organic passivation film 105 is formed to cover the leader lines 104 and the interlayer insulating film 103. The organic passivation film 105 is formed as thick as about 2 to 3 μm to double as a planarizing film. The first wall 10 and the second wall 20 are formed over the organic passivation film 105. The first wall 10 is topped by the first electrode 11. The second wall 20 is topped by the second electrode 21.

The first wall 10 or the second wall 20 may be formed at the same time as the organic passivation film 105 or may be produced in a process separate from that of the organic passivation film 105. To form the first wall 10 or the second wall 20 at the same time as the organic passivation film 105 involves making a thick organic passivation film 105 first and subjecting to photolithography using the half exposure method.

In FIG. 2, the first electrode 11 is formed over the first wall 10 and the second electrode 21 over the second wall 20. In the display area 50, a capacitance insulating film 106 for insulating the first electrode 11 from the second electrode 21 is formed over the organic passivation film 105, the first wall 10, and the second wall 20, among others. The capacitance insulating film 106 owes its name to the fact that it constitutes a pixel capacitance insulating film between the pixel electrodes and the common electrode in the display area 50. Whereas the ITO-formed second electrode is formed over the capacitance insulating film 106 in the display area 50, there is no such electrode in the seal portion of FIG. 2. An alignment film 107 is formed to cover the capacitance insulating film 106. The alignment film 107 is intended to define the direction of the initial alignment of liquid crystal molecules in the display area 50.

In FIG. 2, the TFT substrate 100 and the counter substrate 200 are disposed opposite to each other with the seal material 110 interposed therebetween. A black matrix 201 is formed over the counter substrate 200. Color filters 202 are formed on the side of the display area 50. The black matrix 201 in the display area 50 is interposed between the color filters 202 to enhance the contrast of the screen. In the seal portion of FIG. 2, the black matrix 201 serves as a light shielding film. An overcoat film 203 is formed to cover the black matrix 201 and the color filters 202. The alignment film 107 is formed over the overcoat film 203.

In FIG. 2, the second wall 20 is formed on the side of the TFT substrate 100 inside the seal material 110 that bonds the TFT substrate 100 and the counter substrate 200 together. The second wall 20 is topped by the second electrode 21. The second electrode 21 may be formed at the same time as the first electrode constituted by ITO in the display area. A negative voltage is impressed to the second electrode 21 to trap positive ions on the side of the seal material 110. The negative voltage may be the same as the potential impressed to the scanning lines. That is, the scanning lines are impressed with a large positive potential only when turned on; they are impressed with a voltage (negative) smaller than a common voltage while being turned off. Consequently, when the same potential as that of the scanning lines is in use, the second electrode is impressed with the negative voltage during periods other than when the scanning lines are turned on, i.e., the second electrode is fed with the negative voltage almost all the time. Generally, the negative potential ranges from −5 V to −7 V.

The negative voltage impressed to the second electrode 21 attracts positive ions in the liquid crystal toward the second electrode 21. This protects the display area 50 from being adversely affected by positive ions. However, when too many positive ions aggregate, the trapping effect of the second electrode 21 is not sufficient to keep the positive ions aggregated. The positive ions then move into the display area 50, causing a black stain to appear there.

Another problem with the second electrode 21 is that when the frame area is narrower, the potential of the second electrode 21 can affect the display area 50. This affects the behavior of the liquid crystal in a manner disturbing the formation of an image in the screen periphery. In recent years, the frame area has been narrowing. For some products, this problem is all the more serious because the distance wfc between the inner edge of the seal material 110 and the edge of the display area 50 is as short as 100 μm.

As shown in FIG. 2, this embodiment bypasses the above problem by forming between the second wall 20 and the display area 50 the first wall 10 topped by the first electrode 11. The first electrode 11 may be formed at the same time as the first electrode constituted by ITO in the display area 50. The first electrode 11 is impressed with the common voltage. In FIG. 2, arrows going from the first electrode 11 to the second electrode 21 represent electric lines of force. With this embodiment, as shown in FIG. 2, the ions collected by the second electrode 21 are trapped between the first wall 10 and the seal material 110. The trapped ions hardly move, if ever, into the display area 50. Because the first electrode 11 is formed over the first wall 10 and because the electric lines of force from the second electrode 21 rarely affect the display area 50, the image in the display area 50 is protected from being affected by the second electrode 21.

Figure 3:
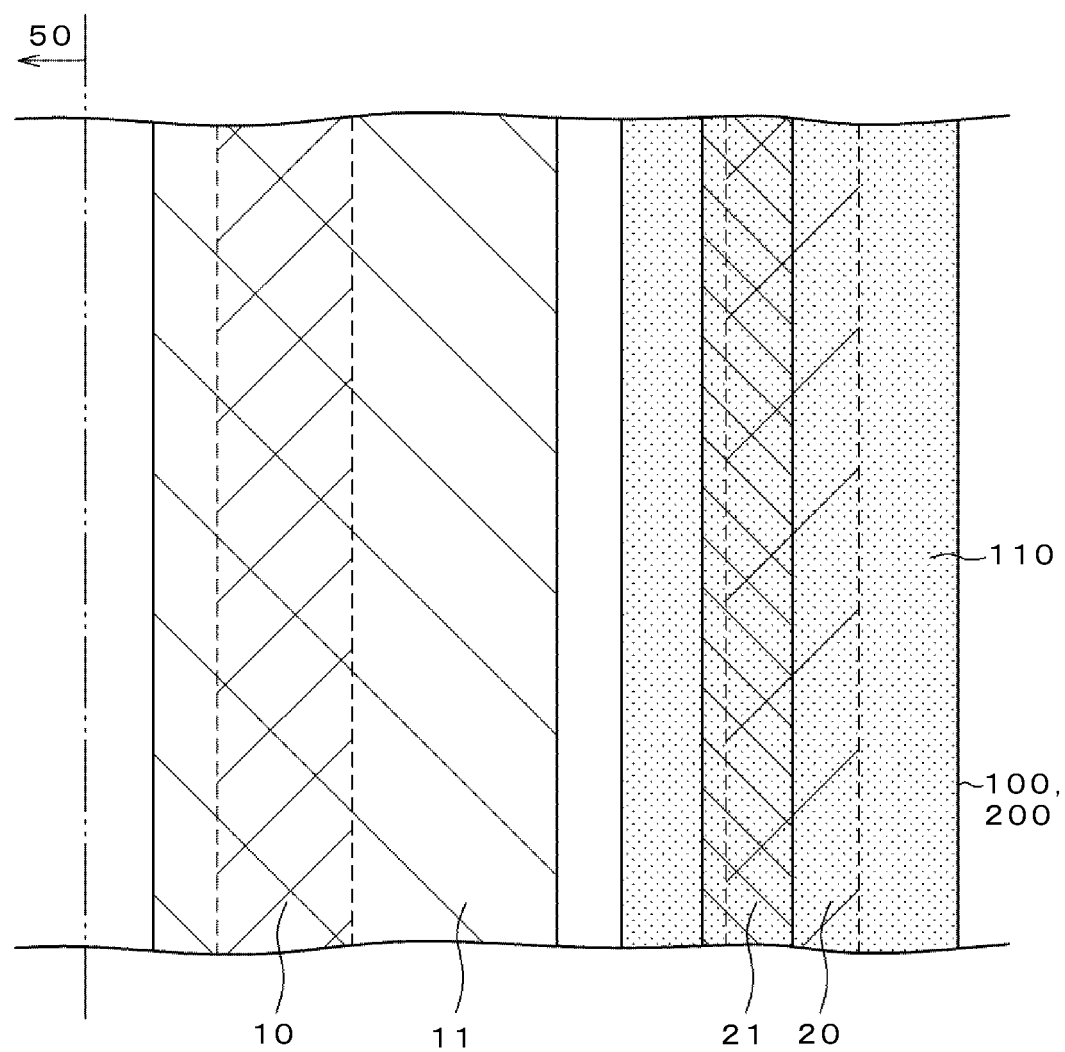
FIG. 3 is an enlarged plan view showing a part in FIG. 1.

FIG. 3 is an enlarged plan view showing a part of the seal portion in FIG. 1. In FIG. 3, the outside of the display area 50 constitutes the frame area. The seal material 110 is formed outside the frame area. Inside the seal material 110, the second wall 20 and the second electrode 21 covering the inner half of the second wall 20 are formed. The first wall 10 is formed between the second wall 20 and the display area 50. The first electrode 11 is formed to cover the first wall 10.

Figure 4:
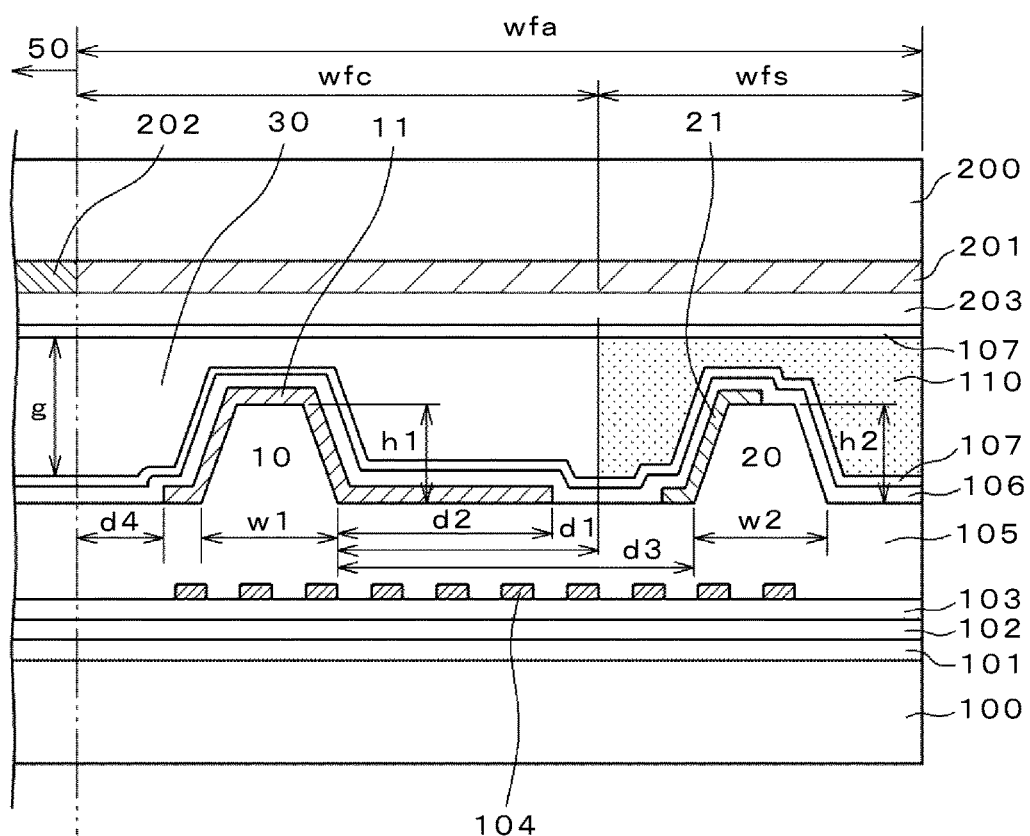
FIG. 4 is a cross-sectional view taken on line A-A in FIG. 1 and shown with typical dimensions.

FIG. 4 is a cross-sectional view showing the sealing portion in FIG. 2 with typical dimensions. In FIG. 4, the outside of the display area 50 constitutes the frame area. The width wfa is 0.4 mm. The TFT substrate 100 and the counter substrate 200 are bonded together by the seal material 110 whose width wfs is 0.3 mm. The distance between the inner edge of the seal material 110 and the edge of the display area 50 is as short as about 100 μm. The gap between the TFT substrate 100 and the counter substrate 200 over the display area 50, i.e., the liquid crystal layer thickness g, is 3 μm, for example.

In FIG. 4, the second wall 20 is formed inside the seal material 110. The height h2 of the second wall 20 is suitably 1 to 2 μm. That is, the height h2 is no more than two-thirds of the layer thickness of the liquid crystal 30 in the display area 50. This leaves a part of the seal material 110 intact on the second wall 20 to ensure the reliable bonding with the seal portion. The width w2 of the second wall 20 is defined at its base and ranges from 10 μm to 20 μm. The second electrode 21 is formed to cover the second wall 20. The second electrode 21 is allowed, but not required, to cover the entire second wall 20. The second electrode 21 serves its purpose when covering the second wall 20 on the side of the display area 50.

The first wall 10 is formed between the second wall 20 and the display area 50. The height h1 of the first wall 10 is suitably 1 to 2 μm. That is, the height h1 is between one-third and two-thirds of the layer thickness of the liquid crystal 30 in the display area 50. If the height h1 of the first wall 10 is too high, it takes a long time for injected liquid crystal 30 to reach the seal material 110; if the height h1 is too low, the effect of the first wall 10 is diminished. The width w1 of the first wall 10 is defined at its base and ranges from 10 μm to 20 μm.

In order to trap positive ions between the first wall 10 and the seal material 110, the distance d1 therebetween is preferably set to about 10 μm through 20 μm. The distance d1 is defined to range from the base of the first wall 10 to the seal material 110.

The first electrode 11 is formed to cover the first wall 10. Besides acting to trap positive ions, the first electrode 11 serves to shield the voltage impressed to the leader lines 104. Thus it is preferred that the first electrode 11 be formed not only over the first wall 10 but also over as wide an area as possible. The distance d2 from the base of the first wall 10 to the edge of the first electrode 11 on the side of the seal material 110 is preferably no less than half the distance d3 between the first wall 10 and the second wall 20, i.e., $d2 \geq d3/2$. Meanwhile, the distance d4 between the edge of the first electrode 11 on the side of the display area 50 and the edge of the display area 50 is preferably as short as possible within a workable range, e.g., from 3 μm to 4 μm.

In the above-described embodiment, the second electrode 21 causes positive ions in the liquid crystal to aggregate and prevents the aggregated positive ions from moving back to the display area 50. Also, the potential of the second electrode 21 is prevented from affecting the display area 50. Consequently, the appearance of black stains is forestalled, and image degradation in the screen periphery attributable to the second electrode 21 is prevented.

Figure 5:
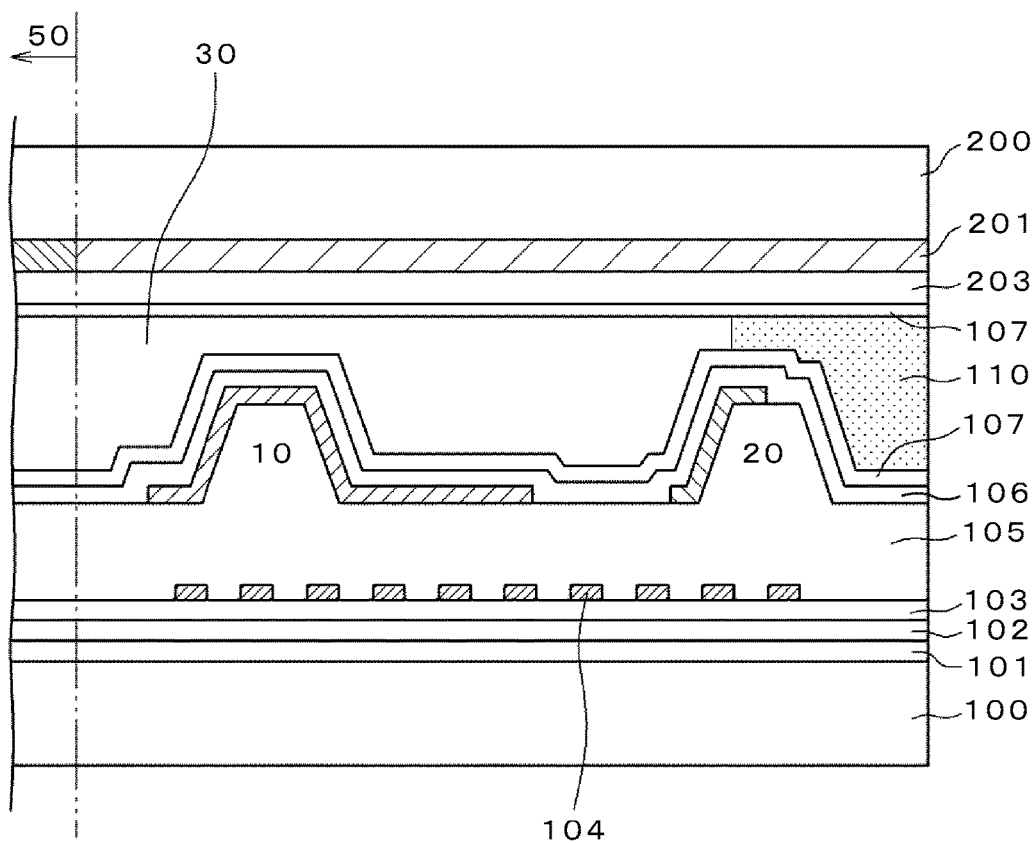
FIG. 5 is a cross-sectional view of a seal portion as a variation in the present disclosure.

FIG. 5 is a cross-sectional view of the seal portion as a variation in the present disclosure. What makes the structure of FIG. 5 different from that of FIG. 3 is that the seal material 110 covers about half the second wall 20, not the entire second wall 20. In the structure of FIG. 5, the second electrode 21 is located closer to the liquid crystal layer. This enables the second wall 20 to exert its influence more strongly and thereby improve its ion-trapping effect. Meanwhile, the presence of the first wall 10 and of the first electrode 11 prevents the ion-trapping potential from affecting the display area. The other specifics of the structure in FIG. 5 are the same as described above in reference to FIG. 3 and thus will not be discussed further.

Figure 6:
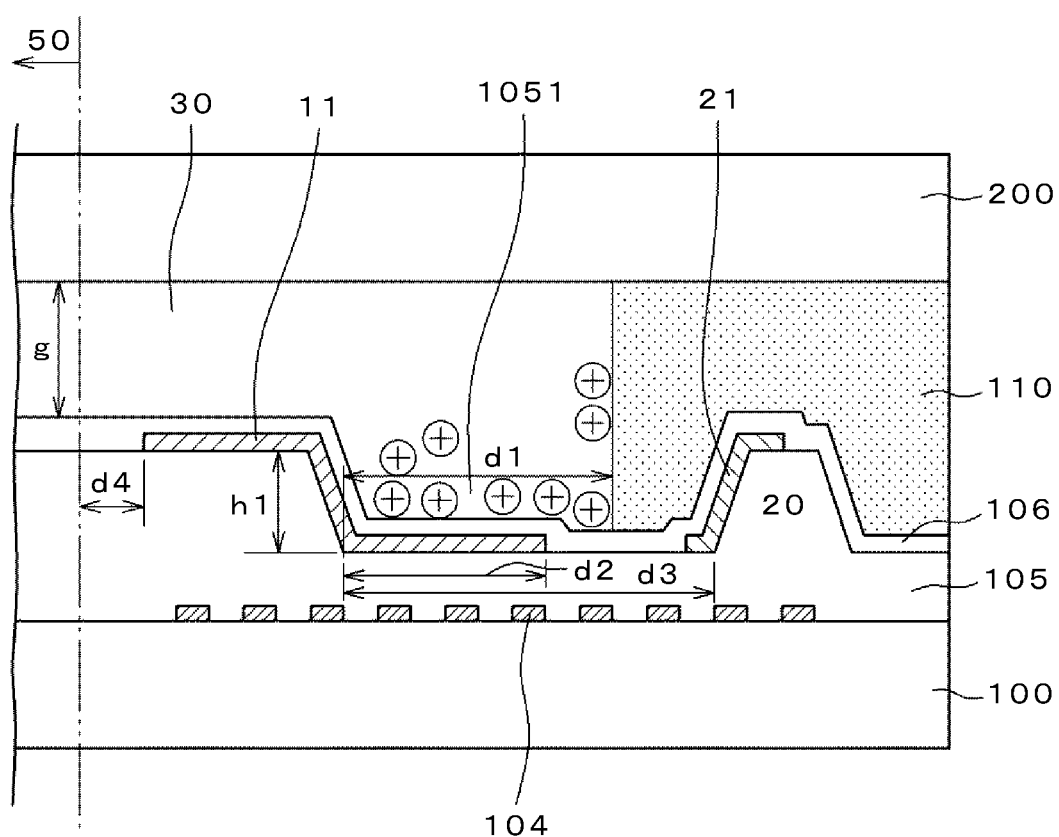
FIG. 6 is a cross-sectional view of the seal portion as another variation in the present disclosure.

FIG. 6 is a cross-sectional view of the seal portion as another variation in the present disclosure. In FIG. 6 and subsequent drawings, the details of the layered structure are omitted. What characterizes the structure of FIG. 6 is that instead of the first wall 10 being formed, the organic passivation film 105 is configured to have a groove-like concave portion therein to trap positive ions. Outside the display area 50 in FIG. 6, the organic passivation film 105 is thinned to form the concave portion that traps ions. The concave portion is formed in a groove-like shape between the display area 50 and the second wall 20 and in a manner surrounding the display area 50.

In FIG. 6, as in FIG. 3, the second wall 20 and the second electrode 21 are formed inside the seal material 110. In FIG. 6, the first electrode 11 is formed in a manner covering a side wall of the concave portion in the organic passivation film 105 as well as two planes contiguous with the side wall. As shown in FIG. 6, positive ions are trapped in the concave portion of the organic passivation film 105. The electric lines of force from the second electrodes 21 are terminated by the side wall of the concave portion and by the first electrode 11 formed in the vicinity. This protects the display area 50 from being affected by the electric lines of force.

In FIG. 6, the depth h1 of the concave portion is the same as the height h1 of the first wall in FIG. 4. That is, the depth h1 is preferably between one-third and two-thirds inclusive of the liquid crystal layer thickness g in the display area 50. The distance d1 from the seal material 110 to the base of the side wall in the organic passivation film 105 is the same as the distance d1 in FIG. 4. The distance d2 from the base of the side wall to the edge of the first electrode and the width d3 of the concave portion, i.e., the width d3 of the groove bottom, preferably satisfy $d2 \geq d3/2$ as in FIG. 4.

The structure in FIG. 6 may be defined alternatively as one in which a groove with the depth h1 is formed in the organic passivation film 105 in a manner surrounding the display area 50, the groove having an inner side wall on which the first electrode 11 is formed, the groove further having an outer side wall on which the second electrode 21 is formed. It is in this groove that positive ions are to be trapped.

As described above, the groove-shaped concave portion formed in the organic passivation film 105 around the display area 50 also serves to prevent positive ions from moving into the display area 50 to trigger a black stain there, while preventing the second electrode 21 from affecting the displayed image. Also, this variation of the embodiment involves using a larger amount of the seal material 110 than in the structure of FIG. 2 for example. The larger mass of the seal material 110 helps improve the reliability of the seal portion being bonded.

Figure 7:
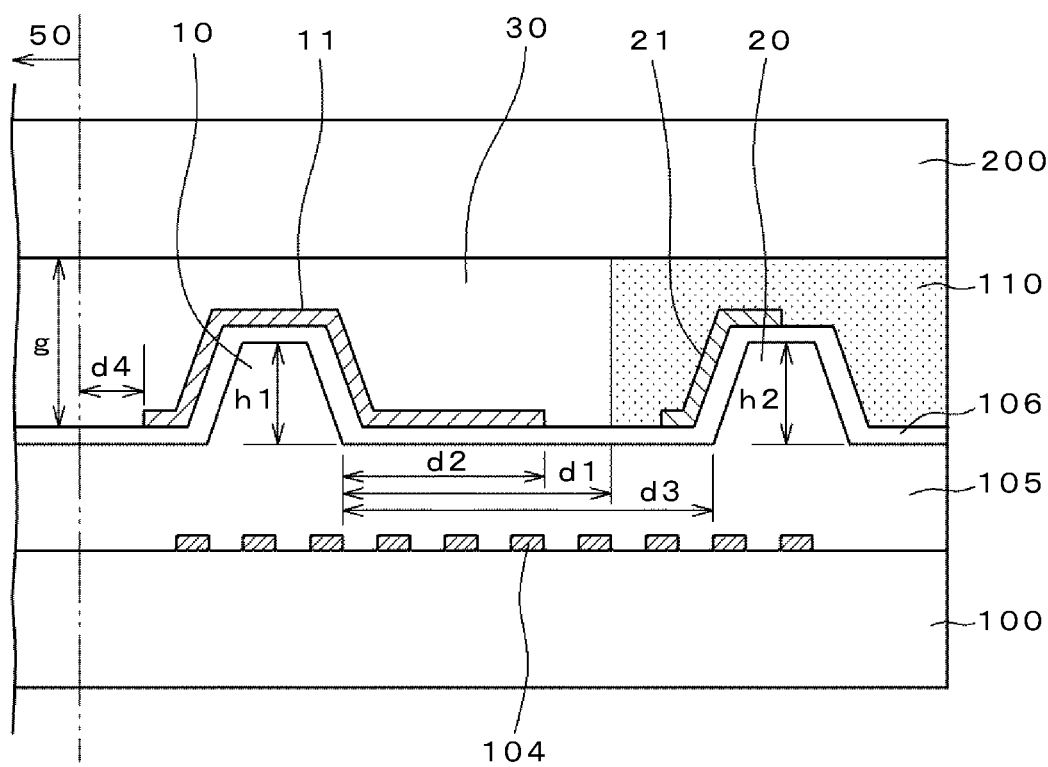
FIG. 7 is a cross-sectional view of the seal portion as still another variation in the present disclosure.

FIG. 7 is a cross-sectional view of the seal portion as still another variation of the embodiment. The details of the layered structure are also omitted in FIG. 7. What characterizes the structure of FIG. 7 is that the first electrode 11 is formed over the first wall 10 as well as over the capacitance insulating film 106 and that the second electrode 21 is formed over the second wall 20 as well as the capacitance insulating film 106. When the first electrode 11 and the second electrode 21 are formed in this manner over the capacitance insulating film 106, the ions in the liquid crystal 30 are more strongly affected by the first electrode 11 and the second electrode 21 than ever.

The second electrode 21 and the first electrode 11 in FIG. 7 may be formed at the same time as the second electrode constituted by ITO in the display area 50. In FIG. 7, the height h2 of the second wall, the height h1 of the first wall, the liquid crystal layer thickness g, the distance d1 between the first wall 10 and the seal material 110, and other dimensions d2 through d4 defining the range in which the first electrode 11 is formed have the same relations with each other as explained above in reference to FIG. 4.

In FIG. 7, both the second electrode 21 and the first electrode 11 are formed over the capacitance insulating film 106. Alternatively, the second electrode 21 alone may be formed over the capacitance insulating film 106, with the first electrode 11 formed under the capacitance insulating film 106. As another alternative, the first electrode 11 alone may be formed over the capacitance insulating film 106, with the second electrode 21 formed under the capacitance insulating film 106.

Figure 8:
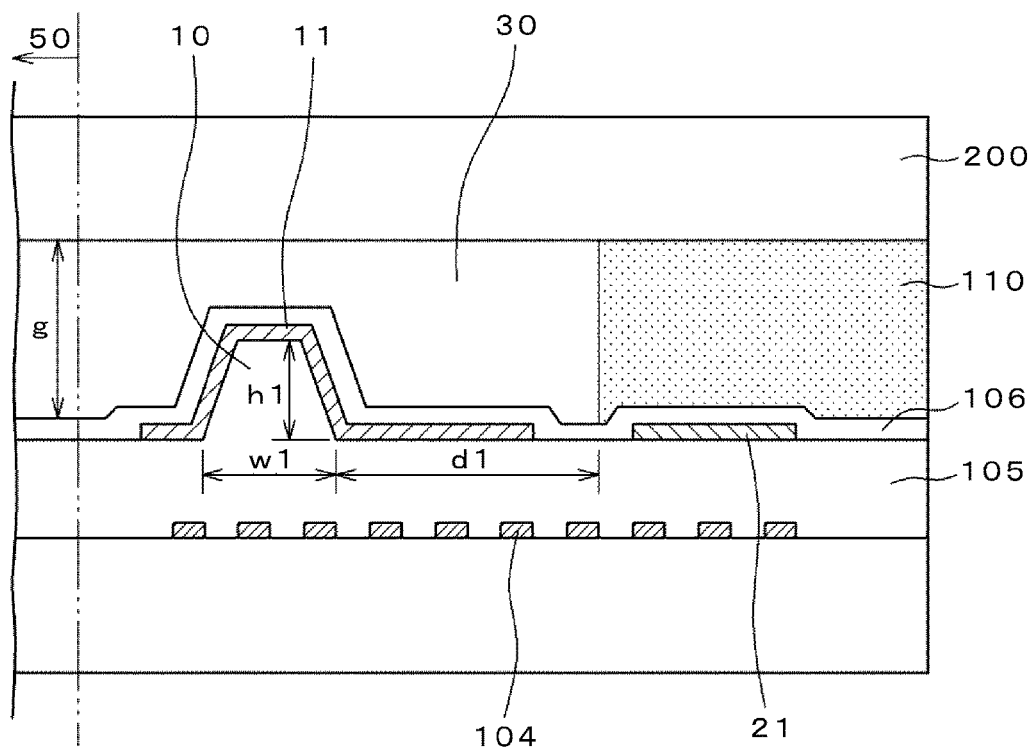
FIG. 8 is a cross-sectional view of the seal portion as still another variation in the present disclosure.

FIG. 8 is a cross-sectional view of the seal portion as still another variation of the embodiment. The details of the layered structure are also omitted in FIG. 8. What characterizes the structure of FIG. 8 is that the second wall 20 is not formed and that the second electrode 21 is formed flat over the capacitance insulating film 106. The structure in FIG. 8 involves boosting the effect of the first electrode 11 so as to prevent the second electrode 21 more effectively from affecting the display area 50.

In this variation, the amount of the seal material 110 is made larger than that in FIG. 2 by as much as the mass of the second wall 20 that is absent. The larger mass of the seal material 110 contributes to improving the reliability of the seal portion being bonded. The other specifics of the structure in FIG. 8 are the same as described above in reference to FIGS. 2 and 4, among other drawings, and thus will not be discussed further.

Second Embodiment

A second embodiment defines where the first wall 10 is to be formed over a liquid crystal display panel as viewed in a plan view. In the structure of the first embodiment in FIG. 1, the first wall 10 is formed in a manner surrounding the entire display area 50. Meanwhile, the regions where ions aggregate are not necessarily along the entire periphery; the ions tend to aggregate in partial regions of the frame area. Where the first wall 10 is formed, it has a reduced distance to the counter substrate 200. That means it takes a longer time to fill the gap between the first wall 10 and the seal material 110 with liquid crystal. The second embodiment is intended to overcome this problem.

Figure 9:
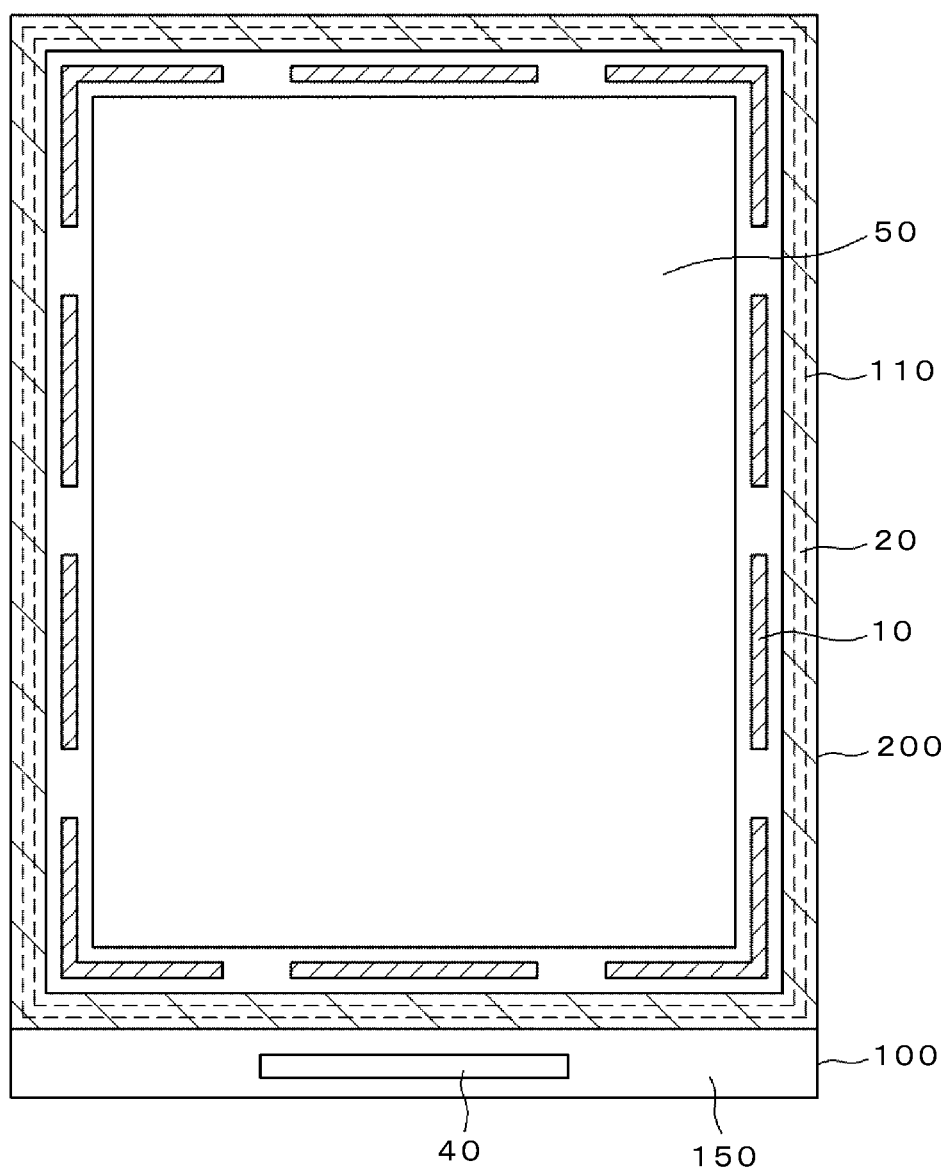
FIG. 9 is a plan view showing a typical liquid crystal display device as a variation in the present disclosure.

FIG. 9 shows an example in which the first wall 10 is formed with space in between. Whereas the first wall 10 in FIG. 9 is shown surrounding the display area 50, there are missing parts of the first wall 10 in FIG. 9. The liquid crystal may be injected through these missing parts to the side of the seal material 110. This arrangement shortens the time required to inject the liquid crystal.

Even where parts of the first wall 10 are missing, it is preferred that the first electrode 11 be formed there. In the missing parts of the first wall 10, the first electrode 11 is formed flat over the insulating film. The missing parts of the first wall 10 may be provided where ions do not aggregate. The missing parts leave the effect of preventing the appearance of a black stain substantially unchanged.

Ions tend to aggregate in the corners. Thus if the first wall 10 is formed only in the corners, the effect of the second embodiment is still maintained, and the time required to inject the liquid crystal is minimally affected. In this case, it is also preferred that the first electrode 11 be also formed where parts of the first wall 10 are missing.

Figure 10:
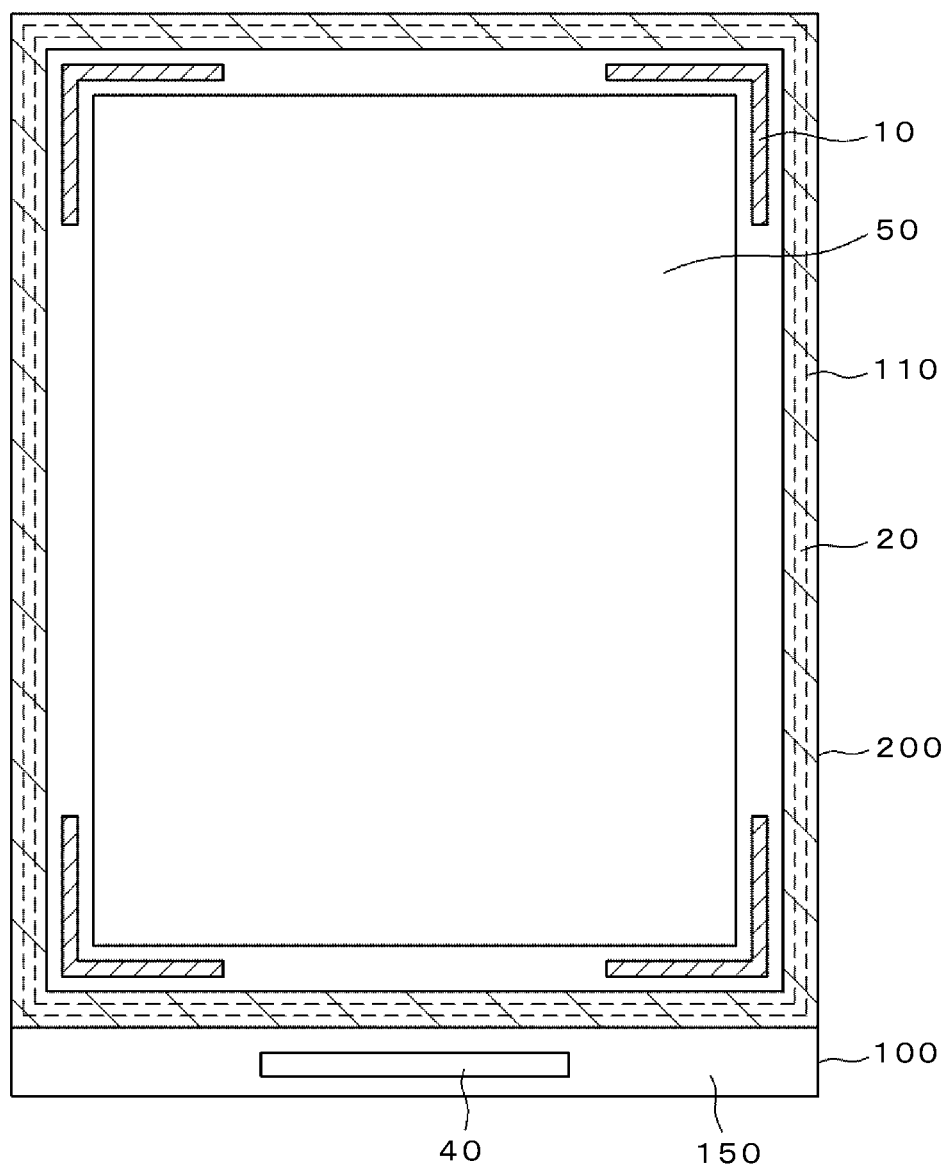
FIG. 10 is a plan view showing a typical liquid crystal display device as another variation in the present disclosure.
Figure 11:
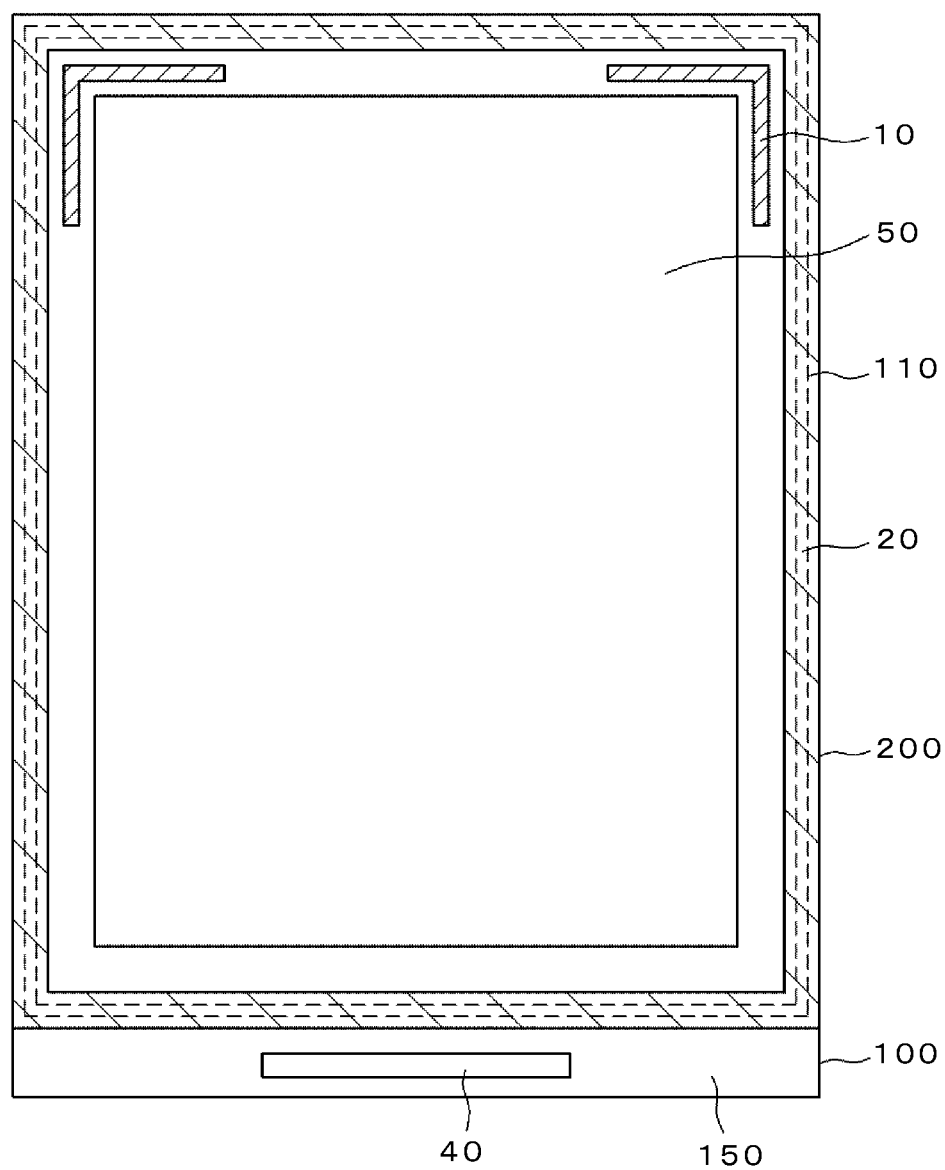
FIG. 11 is a plan view showing a typical liquid crystal display device as another variation in the present disclosure.

As shown in FIGS. 13 to 15, ions are more likely to aggregate in a specific corner. Very often, the location of such an ion aggregate is determined by the shape of the pixel electrodes. Thus if the first wall 10 is formed only in the corner where ions tend to aggregate, the time required to inject the liquid crystal is minimally affected. FIG. 10 shows the first wall 10 is formed at four corners. FIG. 11 shows the first wall 10 is formed at two corners. In this case, too, it is preferred that the first electrode 11 be also formed where parts of the first wall 10 are missing.

Third Embodiment

The first embodiment and second embodiment above were described by assuming that the IPS liquid crystal display device is in use. However, the present disclosure is not limited to IPS devices but is also applicable to liquid crystal display devices operating on the twisted nematic (TN) method or the vertical alignment (VA) method, for example. A major difference between the IPS method and the TN or VA method (hereunder, simply called the VA method or the like) is that with the VA method or the like, the common electrode is formed over the counter substrate. That means only the pixel electrodes are formed on the side of the TFT substrate.

The pixel electrodes are formed over an insulating film and under an alignment film in contact with the latter. In devices using the VA method or the like, the only transparent electrodes on the side of the TFT substrate are the pixel electrodes. It follows that the second electrode disposed over the second wall and the first electrode disposed over the first wall are formed only at the same time as the pixel electrodes. It is to be noted that no capacitance insulating film is necessary in the devices using VA method or the like.

Figure 12:
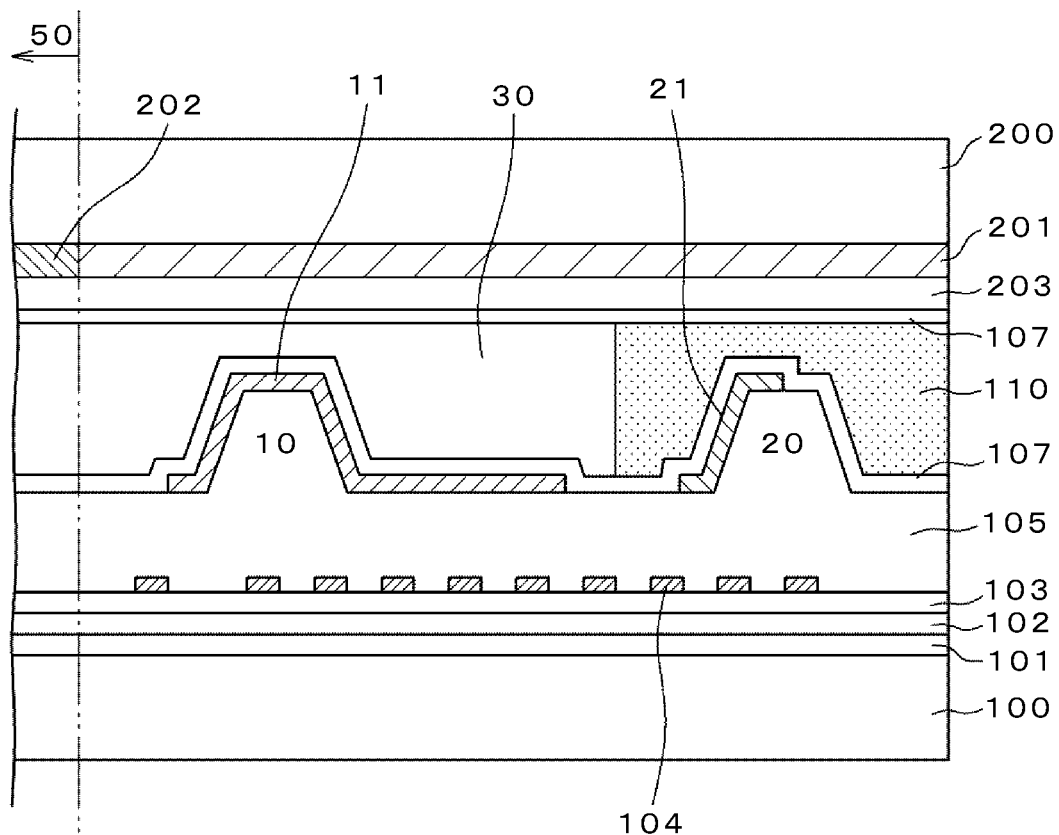
FIG. 12 is a cross-sectional view of the seal portion as another variation in the present disclosure.

FIG. 12 is a cross-sectional view of the seal portion in a liquid crystal display device typically operating on the VA method or the like as a further embodiment of the present disclosure. In FIG. 12, as in the first embodiment, the second wall 20 is formed in the seal material 110; the second electrode 21 is formed over the second wall 20; the first wall 10 is formed between the second wall 20 and the display area 50; and the first electrode 11 is formed over the first wall 10.

What makes the embodiment in FIG. 12 different from the first embodiment in FIGS. 2 and 4 is that the capacitance insulating film 106 is missing over the second electrode 21 and the first electrode 11 and that the second electrode 21 and the first electrode 11 are covered directly by an alignment film. The other specifics are the same as shown in FIGS. 2 and 4. This means that the third embodiment operating on the VA method or the like provides the same benefits as the embodiments operating on the IPS method.

Whereas the foregoing description was based on the assumption that the ions in liquid crystal are positive ions, the present disclosure can also be applied to cases where the ions in liquid crystal are negative ions. Where negative ions are present, the voltage impressed to the second electrode is given a positive potential with regard to the common electrode.

There are two major methods for injecting liquid crystal: the method of vacuum-injecting liquid crystal through an inlet, and the method of instilling liquid crystal into either the TFT substrate or the counter substrate before they are combined. The present disclosure is particularly effective where liquid crystal is injected by the drop fill method.

What is claimed is:

1. A liquid crystal display device comprising a thin-film transistor (TFT) substrate and a counter substrate bonded together along the periphery thereof by a seal material, the TFT substrate and the counter substrate having liquid crystal layer sandwiched therebetween and including a display area,
wherein a second wall is formed outside the display area on the TFT substrate;
the second wall is a wall of a second protrusion protruding from the TFT substrate toward the counter substrate,
a second electrode is formed at least on the second wall;
a first wall is formed between the second wall and the display area;
the first wall is a wall of a first protrusion protruding from the TFT substrate toward the counter substrate,
a first electrode is formed at least on the first wall facing the second wall;
the liquid crystal layer exists between the first wall and the second wall;
at least a portion of the second wall overlaps with the seal material in a plan view;
the first wall has a gap against the counter substrate;

the gap is smaller than a thickness of the liquid crystal layer in the display area; and voltages applied to the first electrode and the second electrode are different.

2. The liquid crystal display device according to claim 1, wherein the height of the first wall, represented by h1, and the thickness of a liquid crystal layer in the display area, represented by g, are in a relationship defined as $g/3 \leq h1 \leq 2g/3$.

3. The liquid crystal display device according to claim 1, wherein the height of the second wall, represented by h2, and the thickness of a liquid crystal layer in the display area, represented by g, are in a relationship defined as $g/3 \leq h2 \leq 2g/3$.

4. The liquid crystal display device according to claim 1, wherein the first wall is formed in a manner surrounding the entire display area.

5. The liquid crystal display device according to claim 1, wherein the first wall is formed in a manner surrounding the display area with space in between.

6. The liquid crystal display device according to claim 1, wherein the first wall is formed only at locations corresponding to the corners of the display area.

7. The liquid crystal display device according to claim 1, wherein the first wall is formed only at a location corresponding to one of multiple corners of the display area.

8. The liquid crystal display device according to claim 1, wherein the liquid crystal display device is an in-plane-switching (IPS) liquid crystal display device having a fourth electrode formed over a third electrode with an insulating film interposed therebetween, the liquid crystal being driven by a voltage impressed between the third electrode and the fourth electrode; and wherein the first electrode is formed with the same layer as that of the third electrode.

9. The liquid crystal display device according to claim 1, wherein the liquid crystal display device is an in-plane-switching (IPS) liquid crystal display device having the fourth electrode formed over the third electrode with an insulating film interposed therebetween, the liquid crystal being driven by a voltage impressed between the third electrode and the fourth electrode; and wherein the first electrode is formed with the same layer as that of the fourth electrode.

10. The liquid crystal display device according to claim 1, wherein the liquid crystal display device is a liquid crystal display device operating on a twisted nematic (TN) method or a vertical alignment (VA) method and having pixel electrodes formed on the side of the TFT substrate and a common electrode on the side of the counter substrate; and wherein the first electrode is formed with the same layer as that of the pixel electrodes.

11. The liquid crystal display device according to claim 1, wherein the first electrode is formed on at least in part of a top surface of the first protrusion, and the second electrode is formed on at least in part of a top surface of the second protrusion.

12. A liquid crystal display device comprising a thin-film transistor (TFT) substrate and a counter substrate bonded together along the periphery thereof by a seal material, the TFT substrate and the counter substrate having liquid crystal layer sandwiched therebetween and including a display area, wherein:

a second electrode is formed in the seal material on the TFT substrate;

a first wall is formed between the second electrode and the display area;

the first wall is a wall of a first protrusion protruding from the TFT substrate toward the counter substrate;

a first electrode is formed at least on the first wall facing the seal material;

the liquid crystal layer exists between the first wall and the seal material;

voltages applied to the first electrode and the second electrode are different;

the first wall has a gap against the counter substrate; and the gap is smaller than a thickness of the liquid crystal layer in the display area.

13. The liquid crystal display device according to claim 12, wherein the height of the first wall, represented by h1, and the thickness of a liquid crystal layer in the display area, represented by g, are in a relationship defined as $g/3 \leq h1 \leq 2g/3$.

14. The liquid crystal display device according to claim 12, wherein the first electrode is formed on at least in part of a top surface of the first protrusion.

* * * * *